United States Patent [19]

Deike

[11] Patent Number: 4,903,547
[45] Date of Patent: Feb. 27, 1990

[54] ACTIVATION APPARATUS FOR A DIFFERENTIAL PAWL WITH AN ACTUATOR

[75] Inventor: Horst Deike, Clauen, Fed. Rep. of Germany

[73] Assignee: Wabco Westinghouse Fahrzeugbremsen GmbH, Hanover, Fed. Rep. of Germany

[21] Appl. No.: 290,654

[22] Filed: Dec. 27, 1988

Related U.S. Application Data

[62] Division of Ser. No. 44,912, Apr. 30, 1987, Pat. No. 4,819,511.

[30] Foreign Application Priority Data

May 2, 1986 [DE] Fed. Rep. of Germany ....... 3614863

[51] Int. Cl.[4] .............................................. F16H 1/44
[52] U.S. Cl. ...................... 475/84; 475/118; 475/150; 475/153
[58] Field of Search ............................... 74/710.5, 711

[56] References Cited

U.S. PATENT DOCUMENTS

| 3,845,671 | 11/1974 | Sharp et al. | 74/711 |
| 4,156,547 | 5/1979 | Marsh | 74/711 |
| 4,347,760 | 9/1982 | Jewett | 74/711 |
| 4,467,886 | 8/1984 | DeClaire et al. | 74/711 |
| 4,724,935 | 2/1988 | Roper et al. | 74/710.5 |

FOREIGN PATENT DOCUMENTS

| 3543894 | 6/1987 | Fed. Rep. of Germany . | |
| 1130501 | 12/1984 | U.S.S.R. | 74/711 |

Primary Examiner—Leslie A. Braun
Assistant Examiner—Harold F. Macris
Attorney, Agent, or Firm—James O. Ray, Jr.

[57] ABSTRACT

An automatic activation apparatus for a differential pawl which is independent of intervention by an operator of a vehicle, the invention controls the energy supply to the actuator by means of a control logic with two signal inputs. The control logic is fed a wheel slip signal directly at one signal input, and via a break-delay timing element at its other signal input. The control logic is thereby designed so that, by the excitation of both signal inputs, it switches into a standby position and then into its active position only upon the excitation of its signal input connected with the timing element.

48 Claims, 4 Drawing Sheets

ACTIVATION APPARATUS FOR A DIFFERENTIAL PAWL WITH AN ACTUATOR

FIELD OF THE INVENTION

This is a divisional of co-pending application Ser. No. 07/044,912, now U.S. Pat. No. 4,819,511, filed on Apr. 30, 1987.

The present invention relates, in general, to differential pawls and, more particularly, the invention relates to an activation device for a differential pawl.

BACKGROUND OF THE INVENTION

In motor vehicle technology, a differential pawl is used to improve the drive conditions if at least one driven wheel of the vehicle begins to slip. In this case, the differential pawl substantially synchronizes all the driven wheels, or the driven wheels of one axle, so that they rotate together. Because it acts in an interlocking manner, as a rule, the differential pawl may not be activated during slipping in the engagement direction, to prevent damage to components of the differential pawl and/or damage to the drive mechanism powering the wheels. In addition, the differential pawl as a rule should not remain in the engaged position any longer than absolutely necessary, since the above-mentioned torsional connection of the driven wheels, during normal vehicle operation, can result in damage to the components mentioned above.

Activation devices of the type mentioned above are described in an unpublished German Patent Application P 35 43 894.0. This apparatus of the prior art has actuators which use the pressure of a pressure medium as an energy source. The energy supply is controlled by a control logic or an engagement logic, to which is fed, at a first signal input, an electrical signal produced when at least one drive wheel slips, as a function of the slip, called the wheel slip signal below, and a signal which can be produced arbitrarily is fed to a second signal input. A prerequisite for the action of the activation devices of the prior art is that the driver must produce the arbitrary signal. As a consequence of the input of the arbitrary signal, the control logic assumes a standby position, when the wheel slip signal is received at the input and as long as it remains present thereafter; it also switches from the standby position into an active position, in which it releases energy when the wheel slip signal disappears after synchronization of the driven wheels has been achieved. To disengage the differential pawl, the arbitrary interruption of the arbitrary signal previously generated is necessary.

A disadvantage of these activation devices of the prior art is that they require the intervention of the driver. Therefore, the correct operation of the differential pawl depends on the driver's ability to notice that at least one of the driven wheels is slipping, and to promptly release the differential pawl to protect the above-mentioned components.

SUMMARY OF THE INVENTION

Disclosed in the present application is an activation apparatus for a differential pawl which includes an actuator that is placed in an engagement position of the differential pawl by an energy supply. A control logic device is provided to control such energy supply. The control logic device includes at least two signal inputs. To a first of these signal inputs a signal which is a function of the wheel slip, called the slip signal below, is fed.

The control logic device is designed such that only when the second signal input receives a signal will it release energy to the actuator. There is also provided a break-delay timing element to which the wheel slip signal is fed as the energy signal. The output signal of the break-delay timing element is fed to the second signal input of the control logic device.

OBJECTS OF THE INVENTION

It is, therefore, one of the primary objects of the present invention to improve an activation device for a differential pawl which, by relatively simple means, can operate both automatically and independently from the driver of the vehicle.

Another object of the present invention is to provide an activation device for a differential pawl which can be utilized regardless of the type of energy used to control the actuator, specifically, it can be used with an electromagnetically-activated or a fluid pressure-activated control element, or a combination of the two, a "combination," for example, can consist of an actuator which is hydraulically activated and electrically retracted, or an actuator which is electrically activated and hydraulically retracted.

The above and various other objects and advantages of the present invention will become more readily apparent to those persons who are skilled in the motor vehicle art from the following more detailed description when such description is taken in conjunction with the attached drawings and the appended claims.

BRIEF DESCRIPTION OF THE INVENTION

Figure 1:
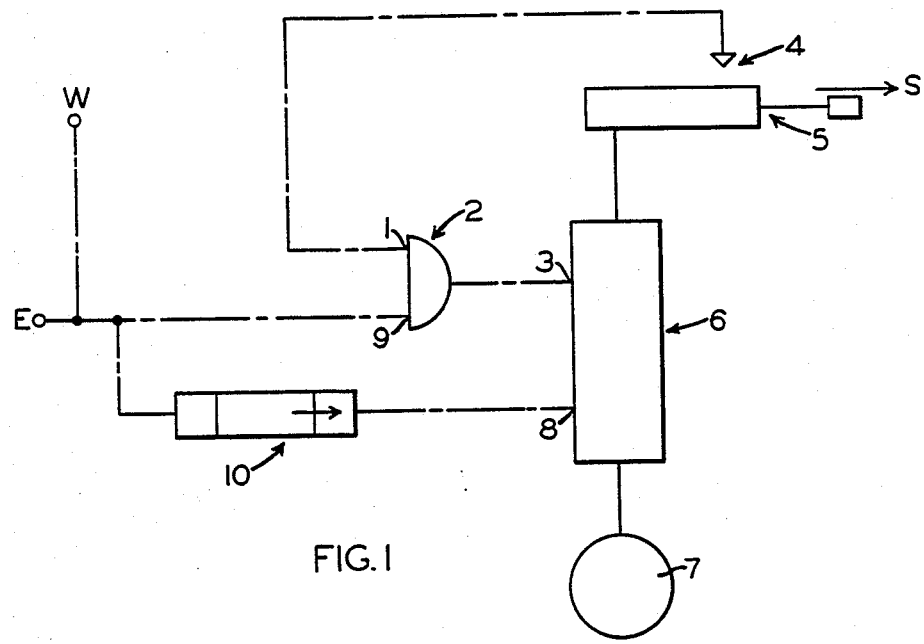
FIG. 1 is a schematic illustration which shows an activation apparatus for a differential pawl with a self-retracting actuator.

Where the term "wheel slip signal" is used in the following description of the invention, it generally means a signal which is a function of the wheel slip signal. Such a signal can, for example, be any suitable and appropriate signal, for example, an acceleration signal or a signal indicating the difference in the speed of rotation, or a velocity difference signal. Throughout the several drawing figures, the same identification numbers have been used to identify elements having identical functions. Furthermore, in the drawings, solid lines are used for energy line and broken lines are used for signal or control lines.

Now refer more particularly to FIG. 1 which is a schematic illustration of an activation apparatus for a differential pawl. As illustrated, the activation apparatus includes an actuator 5, which is moved in the engagement direction (Arrow S) by an energy supply. The energy can be any suitable form of energy, for example, electrical energy or the pressure of a pressure medium. The actuator 5 is designed as a function of the energy used, e.g., it can be magnetically-controlled in the case of electrical energy, or it can be the piston unit of a positioning cylinder in the case of pressure.

To control the energy supply from an energy production source 7, which can also be an energy reservoir, there is a control logic 6 in the energy line between the energy production source 7 and the control element and the actuator 5.

The control logic 6 includes a first signal input 3 and a second signal input 8. At the first signal input 3, the control logic 6 is connected with the output (not shown in any greater detail) of an AND gate 2, whose first input 9 is connected with a wheel slip signal transmitter (E), and whose second input 1 is connected with a position sensor 4. The position sensor 4 monitors the position of the actuator 5 and emits a continuous signal as the position signal, which disappears when the actuator 5 reaches a specified position as it moves in the engagement direction (S).

The wheel slip signal transmitter (E) is also connected with the input of a break delay timing element 10, whose break delay time is either fixed or can be adjusted as a function of the operational requirements and/or the type of vehicle construction. The output of the timing element 10 is connected with the second signal input 8 of the control logic 6.

The control logic 6 is thereby designed such that when there are no input signals, it assumes a base position. When there are signals present at both signal inputs 3 and 8, it assumes a standby position, and when only the second signal input 8 receives a signal, it assumes an action position, in which it releases energy.

In the following description of the operation of the activation mechanism illustrated, it is first assumed that the AND gate 2 and the position sensor 4 are not present. In this case, the wheel slip signal transmitter (E) is instead connected directly with the first signal input 3 of the control logic 6. This assumption is allowable, because the items in question are not necessary in the basic configuration of the invention.

In normal operation, the wheel slip signal transmitter (E) does not emit a wheel slip signal, so that both signal inputs 3 and 8 of the control logic 6 are de-excited, the signal logic is, therefore, in the base position, and the differential pawls are disengaged.

If at least one of the driven wheels corresponding to the activation devices shown slips, then the wheel slip signal transmitter (E) transmits a wheel slip signal which is fed as the slip-dependent signal to the first signal input 3 of the control logic 6 and to the input of the timing element 10. The timing element 10, on the basis of the wheel slip signal, transmits an output signal to the second signal input 8 of the control logic 6. Since both signal inputs 3 and 8 of the control logic 6 are now excited, the control logic 6 assumes the above-mentioned standby position, in which the actuator 5 remains in its disengaged position.

If the slipping wheel is synchronized, which can be controlled, for example, by means of a slip-dependent synchronization apparatus not described in any further detail, the wheel slip signal to the wheel slip signal transmitter (E) and to the first signal input 3 of the control logic 6 and on the timing element 10 disappears. The first signal input 3 of the control logic 6 is now de-excited, while the second input signal 8 remains excited as a result of the break delay of the timing element 10. In this manner, the control logic 6 assumes its active position, in which it releases energy to the actuator 5; the latter is moved in the engagement direction by the energy supply, and engages the differential pawl. The control logic 6 remains in the active position and maintains the energy supply to the actuator 5 until, after the expiration of the break delay of the timing element 10, its output signal disappears. Then both signal inputs 3 and 8 of the control logic 6 are again de-excited. The control logic 6 thereupon returns to its base position, whereby it interrupts the energy supply to the actuator 5 and releases the latter for retraction by means of an automatic retraction device, for example, a retraction spring, not illustrated in any further detail.

In summary, then, the operation of the activation apparatus described above, can be described by noting that it retracts the differential pawl as a consequence of the wheel slip signal independently, and triggers it again after the expiration of the delay induced by the timing element 10.

If a new wheel slip signal occurs during the break delay time of the timing element 10, in the basic configuration described above, the control logic 6 moves from its action position into its standby position with the result that the actuator 5 is returned to its disengaged position. A new wheel slip signal therefore interrupts the activation of the differential pawl. The AND gate 2 in connection with the position sensor 4 offers a remedy against this. In this configuration, the first signal input 3 of the control logic 6 can only be energized with the output signal of the AND gate 2 as the wheel slip-dependent signal if the wheel slip signal transmitter (E) transmits the wheel slip signal and if the position sensor 4 transmits the position signal. The position signal, however, no longer exists, when the actuator 5 in its movement in the engagement direction has reached the above-mentioned specified position. In other words, when the actuator 5 has reached this position, the AND gate 2 is closed on the output side, and the control logic 6 is thereby blocked in the active position until the expiration of the timing element 10. In many cases, it will be appropriate to determine the above-mentioned position so that it is reached as soon as the actuator 5 leaves its disengaged position.

(W) represnts another arbitrarily activated make and-/or break apparatus, by means of which the operating personnel can manually intervene in the above-described automatic operation of the activation apparatus if desired.

Figure 2:
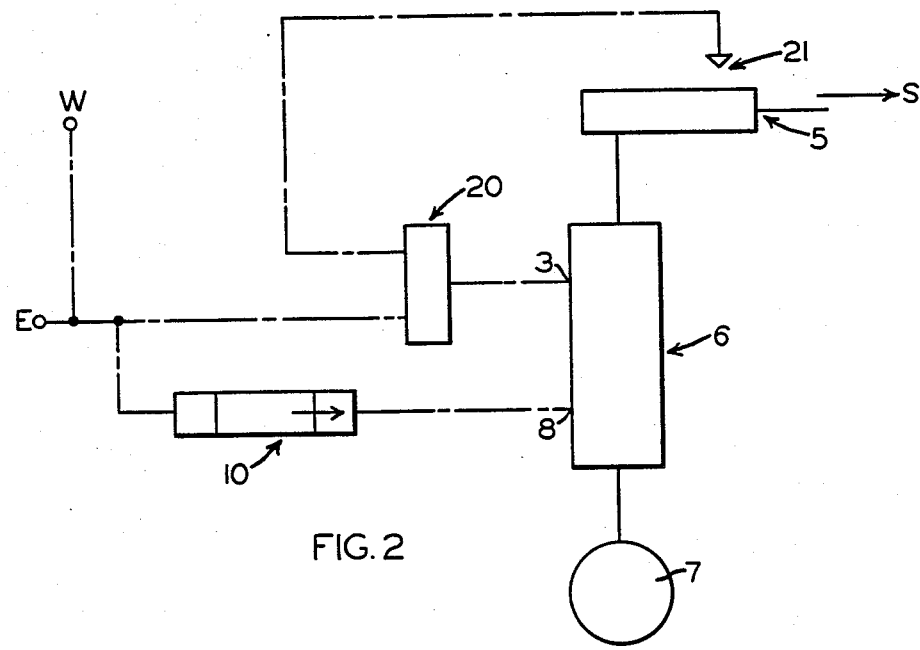
FIG. 2 is a schematic illustration which shows an alternative configuration of the activation apparatus illustrated in FIG. 1.

The alternative embodiment illustrated in FIG. 2 differs from the previous embodiment only in that the AND gate 2 and the position sensor 4 are replaced by a gate 20 and a position sensor 21.

The position sensor 21 again monitors the position of the actuator 5, but it is designed so that it transmits a position signal when the actuator 5 has reached the above-mentioned specified positon in the engagement direction (S). The gate 20 is connected on the input side with the position sensor 21 and with the wheel slip signal transmitter (E). The gate 20 is designed so that, when there is a position signal, it cannot transmit an output signal as a slip-dependent signal. The gate 21 of this embodiment therefore acts in connection with the position sensor 21 like the AND gate 2 of the previous embodiment.

Otherwise, the remarks concerning the previous embodiment illustrated in FIG. 1 also apply for this alternative embodiment of the present invention.

Figure 3:
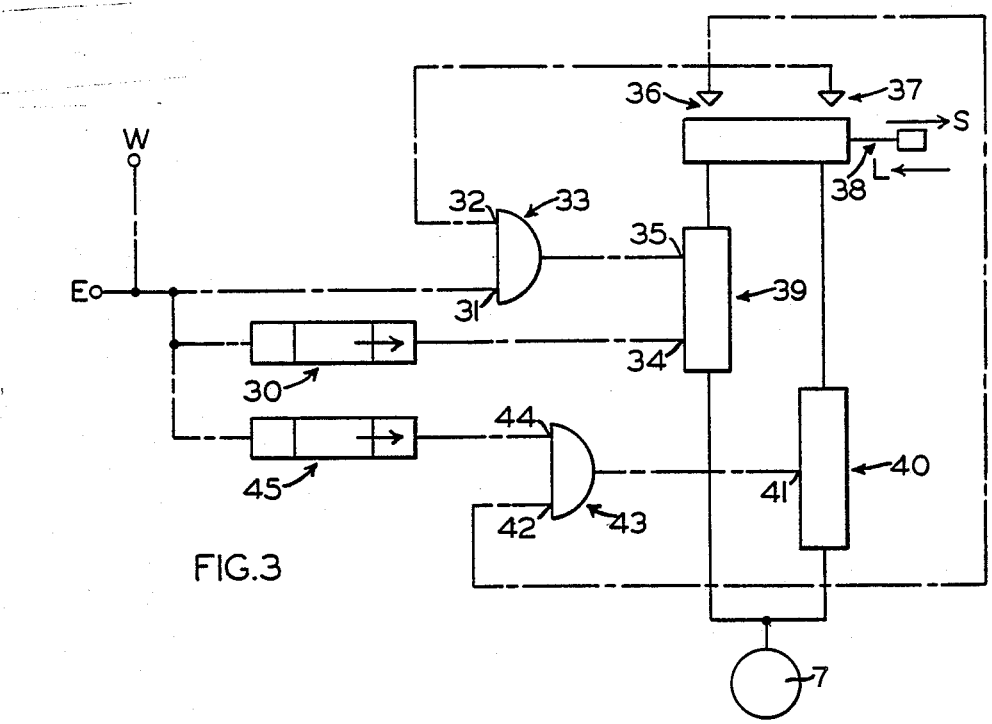
FIG. 3 is a schematic illustration which shows an activation apparatus for a differential pawl with an actuator which can be moved in the engagement direction and in the disengagement direction by an energy supply.

FIG. 3 shows schematically another alternative embodiment of an activation apparatus for a differential pawl, which includes an actuator 38 which is moved in the engagement direction (Arrow S) and in the disengagement direction (Arrow L) of the differential pawl by the energy supply. For the sake of simplicity, the same energy is used in the following explanation for both activation devices. However, different types of energy can be used for the different movement directions and are contemplated in the scope of the claims.

To control the energy supply from the energy production source 7, an engagement logic 39 is located in the energy lines between the energy production source 7 and the actuator 38 in the engagement direction (S), and a disengagement logic 40 in the disengagement direction (L).

The structure and operation of the engagement logic 39 corresponds to the control logic 6 of the embodiment illustrated in FIG. 1.

At its first signal input 35, the engagement logic 39 is connected with the output of an OR gate 33 not shown in any further detail. The first input 31 of the OR gate is connected with the wheel slip signal transmitter (E) and its second signal 32 with a position sensor 37. The position sensor 37 monitors the position of the actuator 38 and transmits an engagement signal when the actuator 38 reaches its engaged position.

At its second signal input 34, the engagement logic 39 is connected with the output of a first timing element 30 not described here in any further detail, the structure and operation of the first timing element 30 corresponds to that of the timing element 10 described in the embodiment illustrated in FIG. 1.

The disengagement logic 40 is designed as a YES gate, i.e., it releases energy when it is excited at its single signal input 41.

At its signal input 41, the disengagement release logic 40 is connected with the output of an AND gate 43 not described in any further detail. The first input 44 of the AND gate is connected with the output of a second break-delayed timing element 45 not shown in any further detail, and its second input 42 is connected with a position sensor 36, which transmits a position signal when the actuator 38 leaves its disengaged position.

The second timing element 45, like the first timing element 30 is connected on the input side with the wheel slip transmitter (E) and is synchronized with it, but it operates inversely, i.e., it transmits an output signal when there is no wheel slip signal. That means that the second timing element 45 delivers an output signal after the expiration of the break delay time of both timing elements 30 and 45.

In the description of the operation of the present alternative activation apparatus, it has been assumed that the OR gate 33 and the position sensor 37, as well as the AND gate 43 and the position sensor 36, are not present. With reference to the embodiment illustrated in FIG. 1, the wheel slip signal transmitter (E) is instead connected directly with the first signal input 35 of the engagement logic 39. In addition, the output of the second timing element 45 is connected directly with the signal input 41 of the disengagement logic 40. With these assumptions, we also get a basic configuration for this embodiment, for which the items in question, although desirable, are not absolutely necessary for the invention to function satisfactorily.

The engagement logic 39 operates in connection with the first timing element 30 in the engagement direction (S) of the actuator 38 like the basic configuration of the embodiment illustrated in FIG. 1.

As a result of the reverse action of the second timing element 45, the disengagement logic 40 is always excited or de-excited, respectively, at its signal input 41 just when the engagement logic 39 is de-excited or excited, respectively, at its second signal input 34. For this reason, the disengagement logic 40 always releases energy to the control element 38 in the disengagement direction (L) when the engagement logic 39 is in its basic or standby position.

In other words, in the present alternative embodiment of the invention, the engagement logic 39 and the disengagement logic 40 are coupled with one another so that, upon the return of the engagement logic 39 from its active position, the actuator 38 is reset by the disengagement logic 40 by the energy supply in the disengagement direction (L).

The optional equipment in this embodiment of the invention, the "OR-gate 33 in connection with position sensor 37" and the "AND-gate 43 in connection with position sensor 36" can be added to the basic configuration either individually, or together.

The OR gate 33, in connection with the position sensor 37, makes certain that the first signal input 35 of the engagement logic 39 is also excited by its output signal (from the OR gate 33) as the slip-dependent signal, and when a wheel slip signal is transmitted by the wheel slip signal transmitter (E) by the position of the actuator 38 into its engaged position. The engagement logic 39 consequently reverses not only when there is a wheel slip signal from its active position into its standby position, but also when the actuator 38 enters its engaged position. Therefore, this special equipment offers two advantages: on the one hand, it provides for an immediate de-energization of the actuator 38 when the latter reaches its engaged position, and thereby makes possible a simplification of such actuator 38. On the other hand, it prevents a repeated supply of energy to the actuator 38 in the engaged position in the engagement direction (S), if the wheel slip signal is repeated within the break delay time of the timing elements 30 and 45.

The AND gate is normally closed when the actuator 38 is in its disengaged position, because then it does not receive an input signal from the position sensor 36. In this condition, the disengagement logic 40 cannot receive an input signal at its signal input 41, and consequently can release no energy to the actuator 38 in the disengagement direction (L). This special configuration therefore offers the advantage that in normal operation (disengaged position) the actuator 38 is not continuously energized and thus can be designed in a more simplified manner.

In a manner not shown, the first timing element 30 and the second timing element 45 can be combined into one timing element with one direct output, as defined above, and one inverting output.

Otherwise, all the remarks made in relation to the preceding embodiments apply as appropriate to the present alternative embodiment of the invention The embodiments described above can be utilized with circuit and logic elements of any suitable type, as described above.

Figure 4:
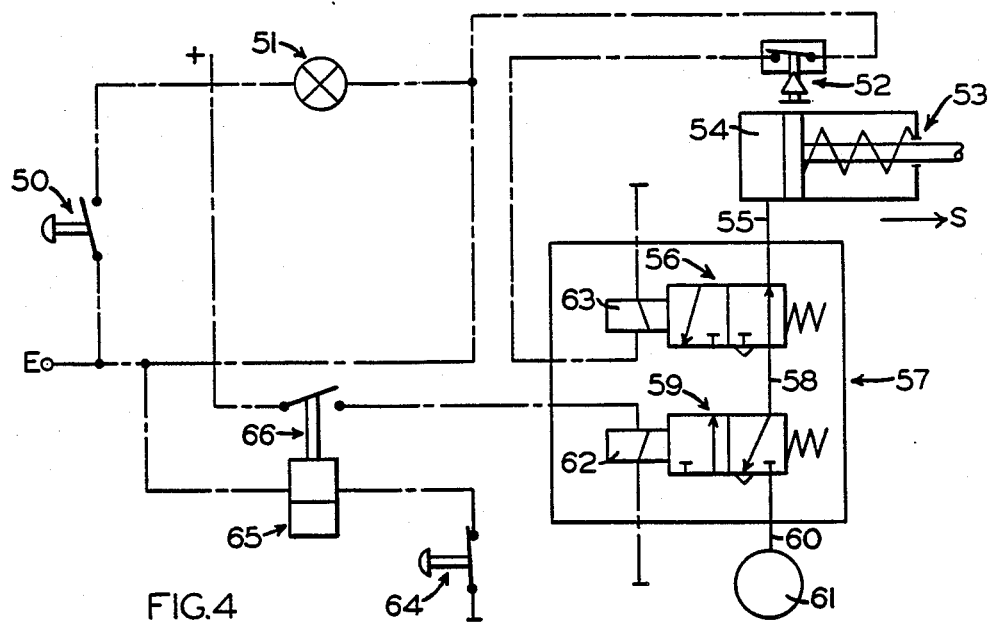
FIG. 4 is a schematic illustration which shows an activation apparatus as illustrated in FIG. 1 incorporating relay technology with a hydraulically-activated actuator.

The alternative embodiment illustrated in FIG. 4 is a configuration of the embodiment illustrated schematically in FIG. 1, namely, an activation apparatus for a differential pawl, which includes an actuator 53 which can be moved in the engagement direction (S) by the pressurization of an engagement chamber 54 with the pressure of a suitable pressure medium. The energy production unit is a pressure medium reservoir 61, in whose pressure medium line 55, 58, 60 to the engagement chamber 54 the control logic 57 realized by means of a 3/2-way valve is located.

The return of the actuator 53 in the disengagement direction or position is achieved by means of a retaining spring which is shown schematically, but not described in any further detail.

The control logic 57 includes two magnetically-controlled 3/2-way valves 56 and 59 connected in series in the pressure medium line 55, 58, 60, the second 3/2-way valve 59 opens when the corresponding magnet 62 is excited and the first 3/2-way valve 56, located downstream of the second 3/2-way valve 59 is closed when the corresponding magnet 63 is excited. The magnet 63 of the first 3/2-way valve 56 is used as the first signal input, and the magnet 62 of the second 3/2-way valve 59 is used as the second signal input of the control logic 57. The logic elements in this alternative embodiment are designed using conventional circuit and relay technology.

The break-delay timing element in this alternative embodiment is a break-delay relay 65 with a make contact 66, whose winding is in series with the wheel slip signal transmitter (E) and whose contact 66 is in series with the magnet 62 in its exciter circuit.

The AND gate preceding the magnet 63 as the first signal input of the control logic 57 can be formed by a break contact 52 acting as a position sensor corresponding to the position sensor 4 illustrated in FIG. 1, and the wheel slip signal transmitter (E), whereby the wheel slip signal transmitter (E) and the break contact 52 form the inputs of the AND gate.

The break contact 52 is thereby controlled by the actuator 53 so that its contact is opened when the actuator 53 reaches the specified position in the engagement direction (S).

In the normal position of the control logic 57, both magnets 62 and 63 are de-excited. Since the second 3/2-way valve 59 adjacent to the pressure medium reservoir 61 is in the closed position in this condition, then the portion 55 of the pressure medium line leading directly to the engagement chamber 54 and thus also the engagement chamber 54 are depressurized. If both magnets 62 and 63 are excited, the second 3/2-way valve 59 is in the open position, the first 3/2-way valve 56 is in the closed position and the control logic 57 is in the stand-by position, in which the line portion 55 and the engagement chamber 54 remain depressurized. Only when the magnet 63 of the first 3/2-way valve 56 is again de-excited, can the pressure released from the second 3/2-way valve 59 expand into the line portion 55 and thus into the engagenent chamber 54, and place the actuator 53 in the engaged position (S).

The basic configuration mentioned in the description of FIG. 1 results with the present embodiment if the break contact 52 is either not present and the signal line from the wheel slip signal transmitter (E) to the magnet 63 is realized, or the break contact 52 is bridged.

As an additional apparatus, this alternative embodiment includes an indicator apparatus 51, which is connected in series with the break contact 52 and makes it possible to monitor the operation of the activation apparatus.

A pair of contact elements 50 and 64 are provided which utilize the apparatus (W) of the embodiment illustrated in FIG. 1, and make possible an arbitrary manual intervention of the operating personnel in the activation apparatus, if desired. The contact element 50 is thereby designed as a make contact, which bridges the wheel slip signal transmitter (E) by means of a parallel circuit. The contact element 64 is designed as a break contact connected in series with the winding of the relay 65.

Figure 5:
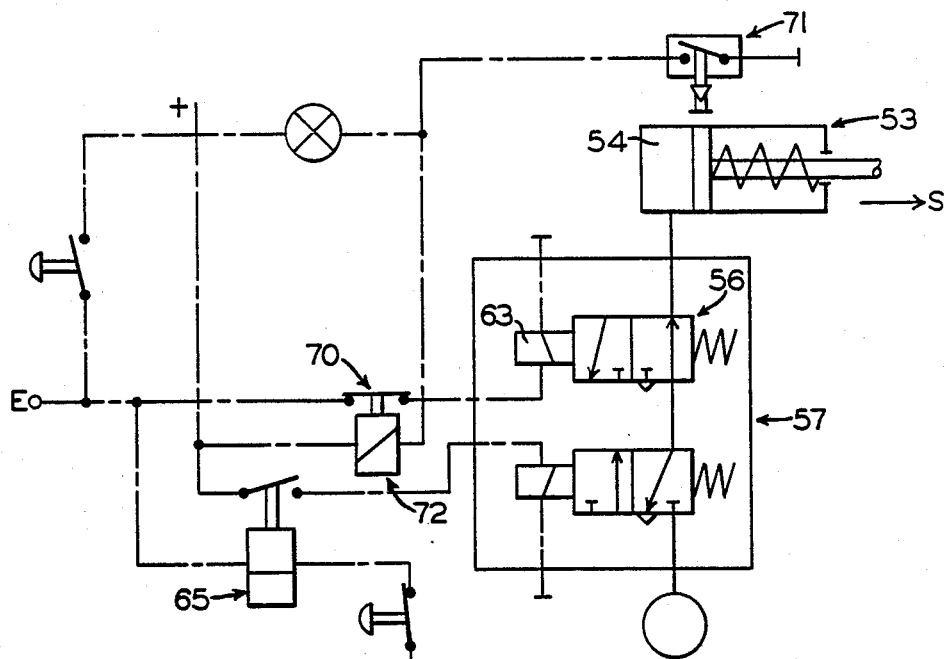
FIG. 5 is a schematic illustration which shows an alternative configuration of the activation apparatus illustrated in FIG. 4.

FIG. 5 shows the embodiment illustrated in FIG. 4 with an alternative configuration of the position sensor and of the gate corresponding to the alternative embodiment illustrated in FIG. 2.

In this embodiment, the position sensor is a make contact 71 controlled by the contact element 53, with a contact which closes when the contact element 53 reaches the specified position in the engagement direction (S). In this case, the gate is formed by the fact that the make contact 71 is in series with the winding of a relay 72 with break contact 70, which break contact 70 is in series with the wheel slip signal transmitter (E) and the magnet 63 of the first 3/2-way valve 56.

When the actuator 53 reaches the specified position in the engagement direction, then by means of the closing contact of the make contact 71, the winding of the relay 72 is excited and its break contact 70 opens, with the result that the magnet 63 cannot be excited. In other words, the gate transmits no output signal, and the pressure medium feed to the engagement chamber 54 cannot be interrupted during the sequence of the relay 65 by a renewed wheel slip signal.

Otherwise, the remarks made in relation to the alternative embodiment illustrated in FIG. 4 also apply as appropriate to this additional alternative embodiment.

Figure 6:
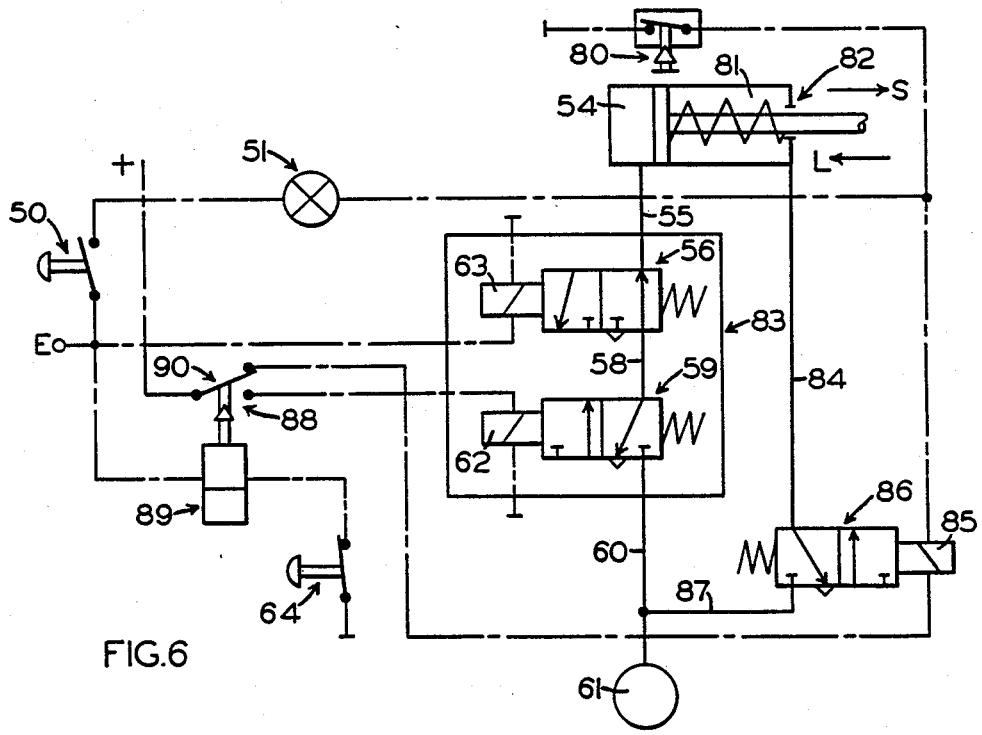
FIG. 6 is a schematic illustration which shows the activation apparatus illustrated in FIG. 3 utilizing relay technology with a hydraulically-activated actuator.

FIG. 6 shows, as one configuration of the alternative embodiment illustraated schematically in FIG. 3, an activation apparatus with a fluid pressure operated actuation 82 which is preferably a hydraulically operated actuator 82, which can be moved by pressurizing an engagement chamber 54 in the engagement direction (S) and by a disengagement chamber 81 in the disengagement direction (L).

As noted above, the actuator 82 need not necessarily by moved in both directions of operation by the same type of energy.

In the pressure medium line again designated 55, 58, 60 between the pressure medium reservoir 61 and the disengagement chamber, there is an engagement logic 83, the construction and operation of which is identical to the control logic 57 described in relation to the embodiment illustrated in FIG. 4.

A YES gate serving as the disengagement logic is designed as a magnetically-controlled 3/2-way valve 86 located in a pressure medium line 84, 87 between the pressure medium reservoir 61 and the disengagement chamber 81, whose magnet 85 represents the signal input of the disengagement logic. The 3/2-way valve 86 is designed so that, when the magnet 85 is de-excited, it closes the passage of the pressure medium line 84, 87 and therefore depressureizes the disengagement chamber 81, and when the magnet 85 is excited, the above-mentioned passage opens, and thereby makes possible the pressurization of the engagement chamber 81.

The logic elements of this embodiment are also executed in generally conventional circuit and relay technology.

As the break-delay timing element, the present embodiment exhibits a break-delay relay 89 with a normally-closed contact 90 and a normally-open contact 88, whose winding is connected in series with the wheel slip signal transmitter (E). The normally-closed contact 90 represents an inverting output, and the normally-open contact 88 represents a direct output of the relay 89 or the timing element. The relay 89 consequently combines the first and second timing elements 30 and 45 of the alternative embodiment illustrated in FIG. 3.

The magnet 85 of the 3/2-way valve 86 is in series with the normally-closed contact 90, while the magnet 62 of the second 3/2-way valve 59 of the engagement logic 83 is connected in series with the normally-open contact 88.

From the description and the operation of the relay 89, it is apparent that, when the wheel slip signal occurs, it switches from the normally-closed contact 90 to the normally open contact 88, retains this position when the wheel slip signal disappears, until the expiration of the break delay, and then switches back from the normally-open contact 88 to the normally-closed contact 90. In this manner, the relay 99 alternatively excites and de-excites the above-mentioned magnets of the engagement logic 83 as a function of the wheel slip signal and the time, and the magnet 85 of the 3/2-way valve 86 serving as the disengagement logic, and thus provides the essential functions of the timing elements 30 and 45 in the embodiment described in relation to FIG. 3.

A make contact 80 controlled by the actuator 82 is also in series with the magnet 85. The contact of this make contact 80 is closed, when the actuator 82 leaves its disengaged position. The make contact 80, the magnet 85 and the normally-closed contact 90 of the break-delay relay 89, in connection with the position sensor 36, form the AND gate 43 described in relation with the embodiment illustrated in FIG. 3.

The basic configuration mentioned in relation to the embodiment illustrated in FIG. 3 results if we assume that the make contact 80 is not present or is bridged.

In a manner not shown, the above-mentioned AND gate can also be formed by connecting the make contact 80 with the winding of an additonal relay and the normally-closed contact 90 of the break-delay relay 89 in series, whereby the (break) contact of the additional relay parallel to its winding is in series with the magnet 85 of the 3/2-way valve 86.

Figure 7:
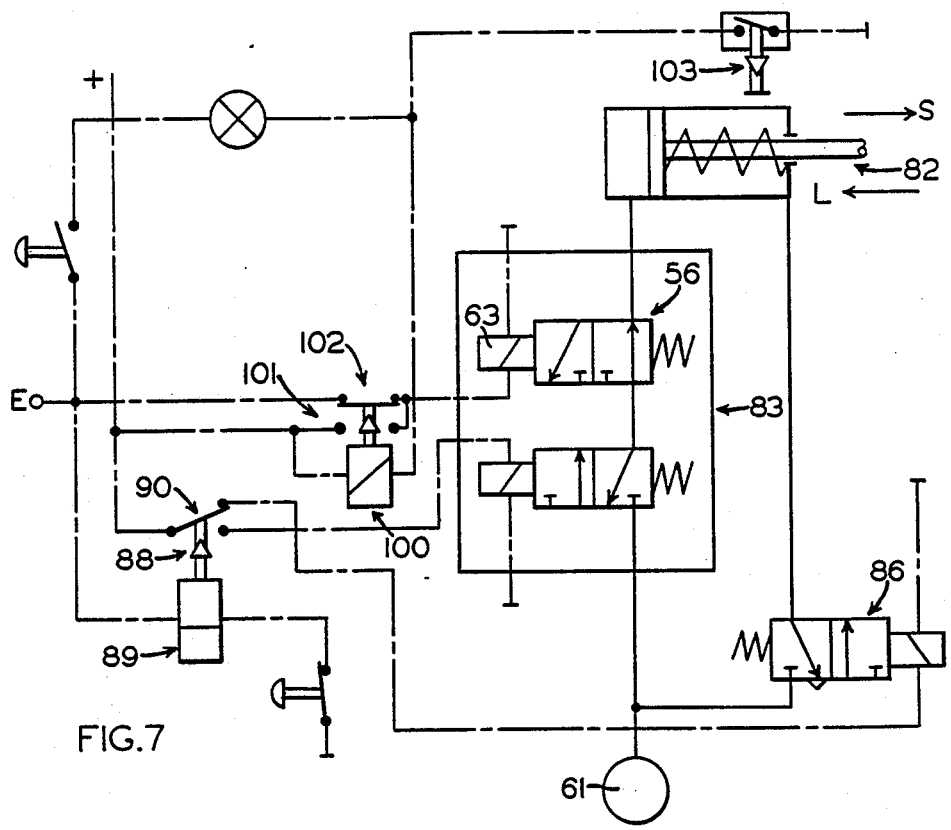
FIG. 7 is a schematic illustration which shows an alternative configuration of the activation apparatus illustrated in FIG. 6.

FIG. 7 shows another configuration of the alternative embodiment illustated in FIG. 6, which can also be combined with that embodiment.

Instead of the make contact 80 used to form the AND gate, the embodiment illustrated in FIG. 7 contains a configuration of the OR gate mentioned in FIG. 3, where it is designated 33, with the corresponding position sensor, designated 37 there.

The position sensor is designed as a make contact 103 controlled by the actuator 82. The contact of the make contact 103 closes when the actuator 82 reaches its engaged position.

The OR gate is designed as a relay 100 with a normally-closed contact 102 and a normally-open contact 101. The winding of the relay 100 lies parallel to the contacts 88 and 90 of the break-delay relay 89 in series with the cake contact 103. Its normally-open contact 101 is parallel to its winding in series with the magnet 63 of the engagement logic 83, while its normally closed contact 102 is in series with the wheel slip signal transmitter (E) and also with the magnet 63.

If the actuator 82 is not in its engaged position, the contact of the make contact 103 is open and the winding of the relay 100 is not excited. The normally-closed contact 102 of the relay 100 is thereby closed, so that the wheel slip signal can act on the magnet 63 and the position of the engagement logic 83 can be influenced as above.

If, however, the actuator 82 reaches its engaged position, the contact of the make contact 103 closes. The winding of relay 100 which is thereby excited closes its normally-open contact 101 and thereby excites the magnet 63 independent of the existence of the wheel slip signal. In this manner, the relay 100 in connection with the make contact 103 excites the magnet 63 as the first signal input of the engagement logic 83 in response to the wheel slip signal or the switching of the make contact 103 and thereby offers the advantages of the optional "OR-gate . . . " described in relation to the embodiment illustrated in FIG. 3.

Otherwise, the remarks made in relation to the embodiments illustrated in FIGS. 4 and 5 apply correspondingly to the embodiments illustrated in FIGS. 6 and 7.

It is apparent that the disengagement logic and the engagement logic, as well as their individual components, can be realized individually and separately, or in combined form.

Instead of the more or less conventional circuit and relay technology described, the functions of the logic elements of the embodiments illustrated in FIGS. 4 to 7 can also be realized in any other appropriate manner, specifically with electronic components.

In addition, it is generally possible for the break-delay time provided by the timing element or elements used for an adaptation of the apparatus to the particular operating conditions and/or the vehicle construction, can be either fixed or adjustable. The break-delay cycle begins with the disappearance of the wheel slip signal.

Furthermore, it is contemplated that the invention can advantageously be combined with an apparatus for the synchronization of the wheels as a function of the wheel slip signal.

The invention can also contain an engagement or release apparatus which can be activated arbitrarily. The engagement apparatus can advantageously be an arbitrarily activated apparatus to produce a signal corresponding to the wheel slip signal.

An indicator apparatus for the operating status of the actuator (i.e., released or engaged position) can also be integrated into the invention.

Generally, as mentioned above, each embodiment of the invention can be realized with circuit and logic elements of any appropriate type. In this context, fluidic and/or electronic components are particularly appropriate, as are components of conventional circuit and relay technology.

The configuration illustrated in FIGS. 1, 2, 4, and 5 is particularly applicable in connection with an automatically disengaging actuator, e.g., by means of a return spring.

In this configuration, when the wheel slip signal occurs, a signal is applied to both signal inputs of the control logic. The control logic thereby switches into a standby position. From this position, when the wheel slip signal disappears, i.e., particularly when the differential pawls of corresponding wheels are synchronized, the control logic switches intto an active position, in which it releases energy to the actuator, which is thereby moved from its released position into its engaged position to retract the differential pawl. In the active position, the control logic (and thus the actuator) remains in the engaged position until the expiration of the break-delay time of the timing element. After the expiration of this period, the signal also disappears at the second signal input of the control logic, whereupon the latter returns to its basic position, and the control element is released to return to its disengaged position, e.g., by a self-resetting apparatus.

In short, therefore, the invention automatically resets the differential pawl as a function of the wheel slip signal, and namely after the disappearance of the wheel slip signal, and after the expiration of the delay induced by the timing element.

It can be seen that several advantageous refinements of the above-mentioned configuration of the invention are possible.

In one configuration there is a position sensor, whose position signal disappears when the actuator reaches a specified position in the engagement direction. This position can be reached, for example, when the actuator leaves its disengaged position. If the position signal and the wheel slip signal are fed to an AND gate and its output signal is fed as the wheel slip signal to the control logic at its first signal input, when the actuator has reached the above-mentioned position in the engagement direction, within the break-delay time of the timer element, this configuration prevents a return of the control logic into its basic position, and thus the retraction of the actuator in the case of a repeated wheel slip signal.

The above-mentioned result is also achieved if the position sensor is designed so that, when the actuator reaches the above-mentioned position, it transmits a position signal, and if, moreover, the wheel slip signal and the position signal are fed to a gate, whose output signal is fed as the wheel slip signal to the first input of the control logic, whereby the gate is designed so that it does not transmit an output signal when there is a position signal present.

The configuration illustrated in FIGS. 3, 6, and 7 is considered in connection with an actuation, which is not designed to be automatically retracting, but is also moved in the disengagement direction of the differential pawl by the application of energy. The engagement logic in this case, in connection with the first timing element, corresponds to the action of the above-mentioned control logic, in connection with the timing element. The additonal disengagement logic provided here assumes its active position, in which it releases energy to the actuator in its disengagement direction, when after the expiration of the break-delay time, the synchronous timing element receives the output signal of the second timing element. This configuration therfore also supplies energy to the actuator in the release direction, and thus actively effects its resetting.

In one refinement of this configuration, there is a position sensor which transmits a position signal when the actuator leaves its disengaged position. If this position signal is fed to an AND gate, by means of which the output signal of the second timing element is fed to the disengagement logic, then this refinement makes certain that the energy supply to the actuator in its disengagement direction is interrupted as soon as the actuator reaches its disengaged position upon retraction. Thereby, in normal operation (i.e., with a disengaged differential pawl), energy is not fed permanently to the actuator. A simplified configuration of the actuator thereby becomes possible.

In one refinement which can also be combined with the configuration described above,, there is a position sensor which transmits an engagement signal, when the actuator reaches its engaged position. If the engagement signal and the wheel slip signal are fed to an OR gate and its output signal is fed as a wheel slip signal to the first signal input of the engagement logic, it represents a solution which on the one hand provides for the interruption of the energy supply to the actuator when it reaches the engaged position, and on the other hand prevents a repeated energy supply in the engagement direction in case of a new wheel slip signal within the break delay time of the timing elements.

The first and the second timing elements can be economically combined in a single timing element with a direct output (i.e., an output, at which a signal corresponding to the input signal is emitted) and an inverting output.

While both a presently preferred as well as a number of alternative embodiments of the present invention have been described above with reference to the attached drawing Figures, it should be understood that other modifications and adaptations of the invention can be made by those persons skilled in the motor vehicle art without departing from the spirit and scope of the appended claims.

I claim:

1. An activation apparatus for a differential pawl, which includes an actuator which can be moved in a direction of an engaged position and in a direction of a disengaged position of such differential pawl by an energy supply to said actuator, a engagement logic circuit to control said energy supply in said direction of said engaged position, said engagement logic circuit including two signal inputs, at a first of said two signal inputs a signal which is a function of a wheel slip can be fed and said control logic circuit being designed so that when only a second signal input of said control logic circuit receives a signal will energy be released to said actuator, a disengagement logic controlling said energy supply to said actuator in said direction of said disengaged position (Arrow L) of such differential pawl, with one signal input, said disengagement logic releasing energy when said one signal input receives an input signal, said signal which is a function of said wheel slip being fed to a break-delay first timing element and to an inverting second timing element which is synchronized with said first timing element, an output signal of said first timing element being fed to said second signal input of said control logic circuit, and an output signal of said second timing element being fed to said signal input of said disengagement logic.

2. An activation apparatus, according to claim 1, wherein said activation apparatus further includes an indicator apparatus for at least one of said disengaged and said engaged position of said actuator which can be controlled by at least one of a break contact and a make contact.

3. An activation apparatus, according to claim 1, wherein a pressure of a pressure medium is used as a energy and said actuator can be moved in said direction of said disengaged position (Arrow L) by pressurization of a disengagement chamber, wherein said disengagement logic includes a magnet-controlled 3/2-way valve with a magnet located in the pressure medium connection between a pressure medium reservoir and a disengagement chamber, said valve is open when its magnet is excited, and said magnet forms a signal input of said disengagement logic.

4. An activation apparatus, according to claim 1, wherein said activation apparatus further includes an apparatus which can be activated arbitrarily to produce a signal corresponding to said signal which is a function of said wheel slip.

5. An activation apparatus, according to claim 4, wherein said arbitrarily activated apparatus which produces said signal which corresponds to a function of said wheel slip is a make contact arranged parallel to said wheel slip signal transmitter (E).

6. An activation apparatus, according to claim 1, wherein said first timing element and said second timing element are combined into a single timing element having one direct output and one inverting output.

7. An activation apparatus, according to claim 6, wherein said single timing element is designed as a break-delay relay with a normally-closed contact and a normally-open contact, whose winding is in series with a wheel slip signal transmitter (E), whereby said normally-closed contact forms said inverting output.

8. An activation apparatus, according to claim 7, wherein a break contact which can be activated arbitrarily is positioned in series with a winding of said break-delay relay.

9. An activation apparatus, according to claim 7, wherein a position sensor, which emits said position signal, when a actuator leaves said disengaged position, is designed as a make contact controlled by said actuator.

10. An activation apparatus, according to claim 9, wherein a pressure of a pressure medium is used as said energy and said actuator can be moved in said direction of said disengaged position (Arrow L) by pressurization of a disengagement chamber, wherein said disengagement logic includes a magnet-controlled 3/2-way valve with a magnet located in the pressure medium connection between a pressure medium reservoir and a disengagement chamber, said valve is open when its magnet is excited, and said magnet forms a signal input of said disengagement logic.

11. An activation apparatus, according to claim 1, wherein a pressure of a pressure medium is said energy and said actuator is moved in said direction of said engaged position (Arrow S) by pressurization of an engagement chamber, and said engagement logic circuit includes:

(a) in a pressure medium line between a pressure medium reservoir and said engagement chamber, there are two magnet-controlled 3/2-way valves in series with a magnet each, a second of which is open when its magnet is excited, and a first 3/2-way valve of which, downstream of said second 3/2-way valve is closed when its magnet is excited;

(b) said magnet of said first 3/2-way valve is used as said first signal output; and (c) said magnet of said second 3/2-way valve is used as said second signal input.

12. An activation apparatus, according to claim 11, wherein said first timing element and said second timing element are combined into a single timing element and said single timing element is designed as a break-delay relay with a normally-closed contact and a normally-open contact, whose winding is in series with a wheel slip signal transmitter (E), whereby said normally-closed contact forms said inverting output.

13. An activation apparatus, according to claim 12, wherein a break contact which can be activated arbitrarily is in series with a winding of said break-delay relay.

14. An activation apparatus, according to claim 12, wherein said position sensor, which emits a position signal, when said actuator leaves its disengaged position, is designed as a make contact controlled by said actuator.

15. An activation apparatus, according to claim 14, wherein a pressure of a pressure medium is used as said energy and said actuator can be moved in said direction of said disengaged position (Arrow L) by pressurization of a disengagement chamber, wherein said disengagement logic includes a magnet-controlled 3/2-way valve with a magnet located in the pressure medium connection between a pressure medium reservoir and a disengagement chamber, said valve is open when its magnet is excited, and said magnet forms a signal input of said disengagement logic.

16. An activation apparatus, according to claim 12, wherein a position sensor, which emits said engagement signal when an actuator has reached said engaged position, is designed as a make contact controlled by said actuator.

17. An activation apparatus, according to claim 16, wherein a pressure of a pressure medium is said energy and said actuator is moved in said direction of said engaged position (Arrow S) by pressurization and of an engagement chamber, and said engagement logic circuit includes:

(a) in a pressure medium line between a pressure medium reservoir and said engagement chamber, there are two magnet-controlled 3/2-way valves in series with a magnet each, a second of which is open when its magnet is excited, and a first 3/2-way valve of which, downstream of said second 3/2-way valve is closed when its magnet is excited;

(b) said magnet of said first 3/2-way valve is used as said first signal output; and (c) said magnet of said second 3/2-way valve is used as said second signal input.

18. An activation apparatus, according to claim 17, wherein an OR gate is designed as a relay with a normally-closed contact and a normally-open contact whose winding parallel to said contacts of said break-delay relay is connected in series with said make contact emitting said engagement signal, whereby its normally-closed contact is connected in series with said magnet of said first 3/2-way valve of said engagement logic circuit, and said wheel slip signal transmitter (E) and its normally-open contact parallel to its winding is in series with said magnet of said first 3/2-way valve of said engagement logic circuit.

19. An activation apparatus, according to claim 1, further including:

(a) a position sensor which emits an engagement signal, when said actuator reaches said engaged position; and (b) said signal which is a function of said wheel slip is fed to said engagement logic circuit as an input signal of an OR gate to whose second input said engagement signal is fed.

20. An activation apparatus, according to claim 19, wherein said position sensor, which emits said engagement signal when said actuator has reached said engaged position, is designed as a make contact controlled by said actuator.

21. An activation apparatus, according to claim 19, wherein said activation apparatus further includes an indicator apparatus for at least one of said disengaged and said engaged position of said actuator which can be controlled by at least one of a break contact and a make contact.

22. An activation apparatus, according to claim 19, wherein said activation apparatus further includes an apparatus which can be activated arbitrarily to produce a signal corresponding to said signal which is a function of said wheel slip.

23. An activation apparatus, according to claim 19, wherein said first timing element and said second timing element are combined into a single timing element having one direct output and one inverting output.

24. An activation apparatus, according to claim 23, wherein said single timing element is designed as a break-delay relay with a normally-closed contact and a normally-open contact, whose winding is in series with a wheel slip signal transmitter (E), whereby said normally-closed contact forms said inverting output.

25. An activation apparatus, according to claim 24, wherein a break contact which can be activated arbitrarily is in series with a winding of said break-delay relay.

26. An activation apparatus, according to claim 24, wherein said position sensor, which emits a position signal, when said actuator leaves its disengaged position, is designed as a make contact controlled by said actuator.

27. An activation apparatus, according to claim 26, wherein a pressure of a pressure medium is used as said energy and said actuator can be moved in said direction of said disengaged position (Arrow L) by pressurization of a disengagement chamber, wherein said disengagement logic includes a magnet-controlled 3/2-way valve with a magnet located in the pressure medium connection between a pressure medium reservoir and a disengagement chamber, said valve is open when its magnet is excited, and said magnet forms a signal input of said disengagement logic.

28. An activation apparatus, according to claim 24, wherein said position sensor, which emits said engagement signal when said actuator has reached said engaged position, is designed as a make contact controlled by said actuator.

29. An activation apparatus, according to claim 28, wherein a pressure of a pressure medium is said energy and said actuator is moved in said direction of said engaged position (Arrow S) by pressurization of an engagement chamber, and said engagement logic circuit includes:

(a) in a pressure medium line between a pressure medium reservoir and said engagement chamber, there are two magnet-controlled 3/2-way valves in series with a magnet each, a second of which is open when its magnet is excited, and a first 3/2-way valve of which, downstream of said second 3/2-way valve is closed when its magnet is excited;

(b) said magnet of said first 3/2-way valve is used as said first signal output; and (c) said magnet of said second 3/2-way valve is used as said second signal input.

30. An activation apparatus, according to claim 29, wherein an OR gate is designed as a relay with a normally-closed contact and a normally-open contact whose winding parallel to said contacts of said break-delay relay is connected in series with said make contact emitting said engagement signal, whereby its normally-closed contact is connected in series with said magnet of said first 3/2-way valve of said engagement logic circuit, and said wheel slip signal transmitter (E) and its normally-open contact parallel to its winding is in series with said magnet of said first 3/2-way valve of said engagement logic circuit.

31. An activation apparatus, according to claim 1, further including:

(a) a position sensor which emits a position signal when said actuator leaves said disengaged position; and (b) said output signal of said second timing element is connected to said disengagement logic by means of an AND gate, whose second input is fed by said position sensor.

32. An activation apparatus, according to claim 31, wherein said position sensor, which emits said position signal, when said actuator leaves said disengaged position, is designed as a make contact controlled by said actuator.

33. An activation apparatus, according to claim 31, wherein said activation apparatus further includes an indicator apparatus for at least one of said disengaged and said engaged position of said actuator which can be controlled by at least one of a break contact and a make contact.

34. An activation apparatus, according to claim 31, wherein said activation apparatus further includes an apparatus which can be activated arbitrarily to produce a signal corresponding to said signal which is a function of said wheel slip.

35. An activation apparatus, according to claim 34, wherein said arbitrarily activated apparatus which produces said signal which corresponds to a function of said wheel slip is a make contact arranged parallel to said wheel slip signal transmitter (E).

36. An apparatus, according to claim 31, further including:

(a) a position sensor which emits an engagement signal, when said actuator reaches said engaged position; and (b) said signal which is a function of said wheel slip is fed to said engagement logic circuit as an input signal of an OR gate to whose second input said engagement signal is fed.

37. An activation apparatus, according to claim 36, wherein said position sensor, which emits said position signal, when said actuator leaves said disengaged position, is designed as a make contact controlled by said actuator.

38. An activation apparatus, according to claim 36, wherein said position sensor, which emits said engagement signal when said actuator has reached said engaged position, is designed as a make contact controlled by said actuator.

39. An activation apparatus, according to claim 36, wherein said activation apparatus further includes an apparatus which can be activated arbitrarily to produce a signal corresponding to said signal which is a function of said wheel slip.

40. An activation apparatus, according to claim 36, wherein said first timing element and said second timing element are combined into a single timing element having one direct output and one inverting output.

41. An activation apparatus, according to claim 40, wherein said position sensor, which emits said position signal, when said actuator leaves said disengaged position, is designed as a make contact controlled by said actuator.

42. An activation apparatus, according to claim 31, wherein said first timing element and said second timing element are combined into a single timing element having one direct output and one inverting output.

43. An activation apparatus, according to claim 42, wherein said position sensor, which emits said position signal, when said actuator leaves said disengaged position, is designed as a make contact controlled by said actuator.

44. An activation apparatus, according to claim 42, wherein said single timing element is designed as a break-delay relay with a normally-closed contact and a normally-open contact, whose winding is in series with a wheel slip signal transmitter (E), whereby said normally-closed contact forms said inverting output.

45. An activation apparatus, according to claim 44, wherein a break contact which can be activated arbitrarily is positioned in series with a winding of said break-delay relay.

46. An activation apparatus, according to claim 44, wherein said position sensor, which emits said position signal, when said actuator leaves said disengaged position, is designed as a make contact controlled by said actuator.

47. An activation apparatus, according to claim 46, wherein a pressure of a pressure medium is used as said energy and said actuator can be moved in said direction of said disengaged position (Arrow L) by pressurization of a disengagement chamber, wherein said disengagement logic includes a magnet-controlled 3/2-way valve with a magnet located in the pressure medium connection between a pressure medium reservoir and a disengagement chamber, said valve is open when its magnet is excited, and said magnet forms a signal input of said disengagement logic.

48. An activation apparatus, according to claim 47, wherein an AND gate is formed by the fact that said make contact, said magnet of said magnet-controlled 3/2-way valve of said disengagement logic, and said normally-closed contact of said break-delay relay are in series.

* * * * *